United States Patent [19]

Yamamoto et al.

[11] Patent Number: 4,551,975
[45] Date of Patent: Nov. 12, 1985

[54] ACTUATOR

[75] Inventors: Masao Yamamoto, Tokyo; Tetsuo Fujiwara, Yokohama, both of Japan

[73] Assignee: Kabushiki Kaisha Toshiba, Kawasaki, Japan

[21] Appl. No.: 681,126

[22] Filed: Dec. 13, 1984

[30] Foreign Application Priority Data

Feb. 23, 1984 [JP] Japan .................................. 59-31367
Mar. 7, 1984 [JP] Japan .................................. 59-41907
Sep. 29, 1984 [JP] Japan ................................ 59-204884

[51] Int. Cl.⁴ .............................................. F01K 7/06
[52] U.S. Cl. ..................................................... 60/528
[58] Field of Search ................................. 60/527, 528

[56] References Cited

U.S. PATENT DOCUMENTS 4,463,560  8/1984  Greenleaf et al. ..................... 60/528

FOREIGN PATENT DOCUMENTS 57141704  0/0000  Japan .

OTHER PUBLICATIONS

The Nikkan Kogyo Shinbun; Nov. 18, 1983.
The Nikkei Industrial Daily; Nov. 25, 1983.

Primary Examiner—Allen M. Ostrager
Attorney, Agent, or Firm—Oblon, Fisher, Spivak, McClelland & Maier

[57] ABSTRACT

An actuator is arranged such that an operation stroke is obtained by a shape memory element made of a shape memory alloy member for recovering a memorized shape when the shape memory alloy member is heated, and that shape recovery control of the shape memory element is performed by Joule heat generated by a current supplied thereto. The shape memory element of this actuator has a mechanism such as conductive layers made of copper-plated layers covering part of the surface of the shape memory alloy. This mechanism decreases an electrical resistance of at least one portion of the element such that it is smaller than the electrical resistance of any other portion thereof. The conductive layers contribute to the partial shape recovery control of the shape memory element with high precision.

8 Claims, 13 Drawing Figures

ACTUATOR

BACKGROUND OF THE INVENTION

The present invention relates to an actuator for obtaining quantitative motion by utilizing a shape memory effect of a shape memory element and, more particularly, to an actuator wherein the shape memory element is made of a shape memory alloy, and the shape recovery control of the shape memory element is performed by Joule heat generated by a current supplied thereto.

It is known that Ni-Ti and Cu alloys each having a predetermined composition ratio have a shape memory effect. Such a shape memory alloy recovers the memorized shape when it is heated to a predetermined temperature. This property can be effectively used for an element (e.g., various actuators and switches) requiring a mechanical stroke or displacement.

In order to recover the shape of the shape memory element made of a shape memory alloy, heat is applied by any heating means to heat the element to a temperature higher than a reverse critical temperature (i.e., a temperature at which the martensite phase disappears). Various types of heating means can be proposed. In an actuator incorporating a shape memory element, a system is adapted such that a current flows through the shape memory element to recover the shape by the Joule heat. In this current heating system, shape recovery control can be achieved by a pulse current. This system provides a simpler control system than any other system.

In a conventional actuator incorporating a shape memory element made of a shape memory alloy, electrodes are formed at two ends of the shape member element. When the shape is recovered, a current flows to the entire shape memory element through these electrodes, thereby converting the current to Joule heat. The current flowing through the shape memory element can flow substantially uniform throughout the shape memory element. Therefore, heat is also uniformly generated throughout the shape memory element, and the shape recovery caused by the uniform heat can be performed uniformly throughout the shape memory element. In this conventional actuator, the shape memory element as a whole is heated to a temperature exceeding the reverse critical temperature and instantaneously recovers the shape in a single step.

However, in the conventional actuator utilizing the single step of shape recovery, only a single operation is performed, thereby limiting the range of operation and resulting in inconvenience. For example, neither griping, similar to that by an operator's fingers, nor a plurality of complicated operations can be performed by a single actuator. Therefore, the conventional actuator has a limited range of applications.

SUMMARY OF THE INVENTION

It is an object of the present invention to provide an actuator wherein a desired, complicated operation is performed by a single actuator, and the range of applications can be greatly widened.

The present invention is directed to a shape memory element, made of a shape memory alloy member, for recovering the memorized shape by Joule heat generated by a current supplied to the alloy member when the alloy member is heated to a predetermined temperature.

The above object of the invention can be achieved by minimizing the electrical resistance at least at one portion of a shape memory alloy member by means of, for example a conductive layer covering such a portion and has electrical resistance lower than any other portion.

According to the actuator of the present invention, a desired, complicated operation is performed by the presence of the means for decreasing the electrical resistance (i.e., the presence of the conductive layer) in the single actuator.

According to an aspect of the present invention, in order to cause the shape memory element to recover its shape, the two ends of the shape memory element are connected to a current source. A predetermined current flows through the shape memory element, and Joule heat is generated to gradually heat the shape memory element. However, an increase in temperature does not occur uniformly throughout the shape memory element. At the portion having the conductive layer thereon, two current paths made of an alloy path and a conductive layer path are formed. A composite resistance of the two current paths is lower than that of any other portion. The current supplied from the current source is shunted to flow through the two current paths. A shunting ratio is determined by the relationship between the electrical resistances of the conductive layer current path and the alloy layer current path. Assuming that ½ of the current supplied from the current source flows through an alloy and that the remaining ½ flows through the conductive layer, heat generated from the alloy portion covered with the conductive layer is decreased to ¼ of the alloy portion not covered with the conductive layer. For this reason, even if the portion without the conductive layer has reached the reverse critical temperature required for shape recovery, the portion with the conductive layer is kept at a lower temperature. In other words, the portion with the conductive layer requires a longer time than the portion without the conductive layer to reach a reverse critical temperature. The change in shape of the shape memory element as a whole at the time of shape recovery can be performed in, for example, a two-step manner. In addition, when a plurality of conductive layers are formed at different portions of the shape memory element, shape recovery can be performed in three or more steps. By controlling the current supply from a current source, heat generated from a portion with the conductive layer can be sufficiently small, thereby preventing shape recovery at this position. In this case, the portion can be selectively kept at intermediate states. According to another aspect of the present invention, the conductive layer is used as an electrode. By using this electrode, a current flows through a predetermined interval of the shape memory element, or a current sequentially flows through the respective intervals, thereby performing shape recovery of the given interval or a continuous shape recovery of the intervals. Therefore, the actuator can be applied to a component such as robot's fingers, which require more complicated motion. A plurality of actions can be performed even if a single actuator is used according to the present invention. Therefore, this actuator provides a variety of industrial applications.

DESCRIPTION OF THE PREFERRED EMBODIMENTS

Figure 1:
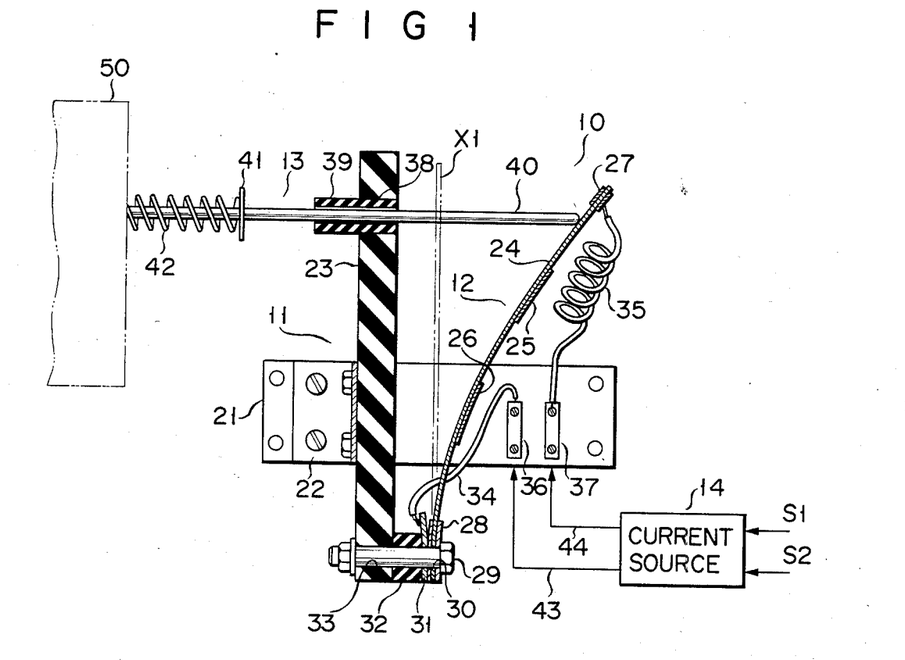
FIG. 1 is a side view showing a partial view of an actuator according to a first embodiment of the present invention.

FIG. 1 shows an actuator 10 of a first embodiment of the present invention. The actuator 10 controls an opening of a valve 50.

The actuator 10 comprises a support mechanism 11, a shape memory element 12, one end of which is supported and fixed by the support mechanism 11 in a cantilever manner, and a transmission mechanism 13 for transmitting a mechanical stroke of the shape memory element 12 at the free end thereof. This stroke corresponds to the opening of the valve 50. The actuator 10 further comprises a current source 14 for selectively supplying a current required for causing the shape memory element 12 to generate Joule heat.

In the support mechanism 11, one end of an L-shaped metal piece 22 is fixed by a support member 21, which is fixed by a proper means on a member (not shown). The other end of the metal piece 22 is fixed on a base structure 23 made of a relatively thick insulating plate.

The shape memory element 12 is made of an Ni (50 at.%)-Ti (50 at.%) alloy plate having a thickness of 0.5 mm, a width of 3 mm and a length of 60 mm. The shape memory element 12 comprises: a strip-like alloy plate 24 obtained such that a metal memorizes a linear shape first and is then worked to have a radius of curvature of 40 mm; conductive layers 25 and 26 formed on one of two surface portions of the alloy plate 24; and conductive layers 27 and 28 deposited on two surfaces at two ends of the alloy plate 24. The conductive layers 25, 26, 27 and 28 are electroplated with copper having a thickness of 20 μm. The conductive layer 25 is formed from a reference position spaced 13 mm distant from the outer end of the conductive layer 27. The conductive layer 25 has a length of 7 mm from the reference position toward the conductive layer 28. The conductive layer 26 is formed from another reference position spaced 21 mm distant from the outer end of the conductive layer 28 on the alloy plate 24. The conductive layer 26 has a length of 7 mm from the reference position toward the conductive layer 27. The conductive layer 27 has a length of 3 mm along the longitudinal direction of the alloy plate 24. The conductive layer 28 has a length of 10 mm along the longitudinal direction of the alloy plate 24. The shape memory element 12 has a free end having the conductive layer 27 and a proximal end having the conductive layer 28. The shape memory element 12 faces the base structure 23 at its right surface in FIG. 1 and is arranged such that the free end thereof is farther than the proximal end thereof with respect to the right surface of the base structure 23. In this state, the proximal end is fixed by a bolt 29 on the base structure 23. A hole 30 is formed at the central portion of the conductive layer 28 and perforates through the alloy plate 24. A conductive plate 31 with a hole and a spacer 32 with a hole are placed on the surface of the conductive layer 28 which is located at the side of the base structure 23. The holes of the conductive plate 31 and the spacer 32 are coaxially aligned with the hole 30. The bolt 29 is inserted through the holes of the conductive plates 31, the spacer 32, and the hole 30. The bolt 29 is inserted in a hole 33 formed in the base 23 and is fastened by a nut. One end of each flexible lead wire 34, 35 is soldered to a corresponding one of the conductive plate 31 and the conductive layer 27. The other end of each lead wire 34, 35 is connected to a corresponding one of terminals 36 and 37 fixed on the support member 21.

A through hole 38 is formed in a portion of the base structure 23 which corresponds to the free end of the alloy plate 24, and a guide cylinder 39 is inserted and fixed in the through hole 38. The transmission mechanism 13 is supported by the guide cylinder 39. The transmission rod 40 is inserted in the guide cylinder 39 to be slidable therein. The transmission mechanism 13 comprises: an insulating rod 40, one end of which is brought into contact with the free end of the alloy plate 24 and the other end of which is connected to an opening angle adjusting part of the valve 50; a collar 41 mounted on the rod 40 at its portion extending between the base structure 23 and the valve 50; and a coil spring 42 inserted between the collar 41 and the valve 50 to apply a biasing force to the rod 40 in the right direction in FIG. 1.

When an external signal S1 is applied to the current source 14, a current of 6 A from the current source 14 is supplied to the alloy plate 24 through lead wires 43 and 44, the terminals 36 and 37, and the lead wires 34 and 35 during the signal S1 is being applied. When the current source 14 receives an external signal S2, a current of 5.5 A is supplied to the alloy plate 24 through the lead wires 43 and 44, the terminals 36 and 37, and the lead wires 34 and 35 during the signal S2 is being applied.

The opening of the valve 50 is controlled in the following manner by the actuator 10 having the construction described above.

When the external signal S1 is supplied from a control microcomputer (not shown) to the current source 14, the current source 14 supplies a current of 6 A to the alloy plate 24, constituting the shape memory element 12, through the lead wires 43 and 44, the terminals 36 and 37, and the lead wires 34 and 35. When the current flows through the alloy plate 24, the alloy plate 24 is gradually heated by Joule heat. In this case, since the conductive layers 25 and 26 are formed at two surface portions of the alloy plate 24 shifted along the longitudinal direction thereof, electrical resistances of the conductive layers 25 and 26 are lower than that of any other portion. Increases in temperature of the portions of the alloy plate 24 with the conductive layers become smaller than that of any other portion without the conductive layer. When the portions without the conductive layers 25 and 26 have reached the reverse critical temperature, these portions return to their intial straight state. When a predetermined period of time has elapsed from this moment, the portions with the conductive layers 25 and 26 become straight. At this moment, the alloy plate 24 as a whole recovers straight, as indicated by the alternate long and two short dashed line X1 in FIG. 1.

Figures 2A, 2B:
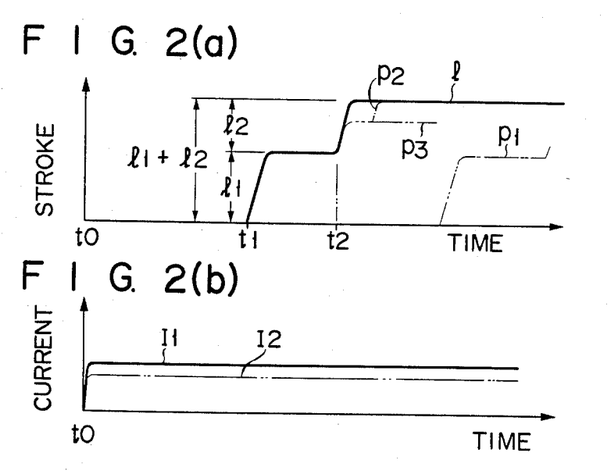
FIGS. 2(a) and 2(b) are respectively graphs for explaining the operation of the actuator shown in FIG. 1.

FIGS. 2(a) and 2(b) show the relationships between the stroke and time and between the current and time in the operation of the actuator. Time is plotted along the abscissa in FIG. 2(a), and a stroke at the free end of the alloy plate 24 is plotted along the ordinate therein. Time is plotted along the abscissa in FIG. 2(b), and a current is plotted along the ordinate therein.

When a current I1 of 6 A flows through the alloy plate 24 from time t0, as shown in FIG. 2(b), the stroke at the free end of the alloy plate 24 at time t1, shown in FIG. 2(a), becomes l1. The stroke l1 is given by shape recovery at the portions of the alloy plate 24 without the conductive layers 25 and 26. The stroke further changes by l2 at time t2 (i.e., when a predetermined period of time has elapsed from time t1), and the final stroke l1+l2 is obtained. The stroke l2 is obtained by shape recovery of the portions with the conductive layers 25 and 26. When a current I2 of 5.5 A is supplied from the current source 14 to the alloy plate 24 in response to the external signal S2, as shown in FIG. 2(b), time required for the step-like change in stroke l1 in FIG. 2(a) is prolonged after the current started to flow, as indicated by the alternate long and two dashed line P1. Similarly, time for the step-like change in stroke l2 is also prolonged. In both cases, the free end of the alloy plate 24 is displaced in the step-like manner. The stroke of the free end is transmitted by the rod 40 of the transmission mechanism 13 to an opening angle adjusting part for the valve 50. Therefore, the opening state of the valve 50 can be controlled by the single actuator 10 in the three-step manner if the zero opening state is included. The valve opening control can be effectively utilized for operating various hydraulic apparatuses and various plants. In this embodiment, the conductive layer 28 is formed on a portion of the shape memory element 12 when this portion is fixed on the base 23 through the bolt 29. Therefore, this portion can be subjected to a limitation of shape recovery. A heavy stress will not act on the fixed portion even if the shape recovery is repeated. Therefore, loosening of the fixed portion can also be prevented.

When the above embodiment is slightly modified, a more complicated control can be performed. For example, when an electrical conductivity of a material for the conductive layer 25 is different from that for the conductive layer 26, or when a thickness and/or a width of the conductive layer changes, the time required for the portion with the conductive layer to reach the reverse critical temperature can be varied. Therefore, the stroke l1 may change to the stroke (l1+l2), and further one more additional step may be provided, as indicated by reference symbol P2 in FIG. 2(a). Furthermore, when one of the conductive layers 25 and 26 is made of a material having a sufficiently large electrical conductivity, and a current flowing through the alloy plate 24 is controlled, the portion with the conductive layer will not be subjected to shape recovery. In this case, the final stroke can be decreased, as indicated by reference symbol P3 in FIG. 2(a), and more minute motion control can be performed.

Figure 3:
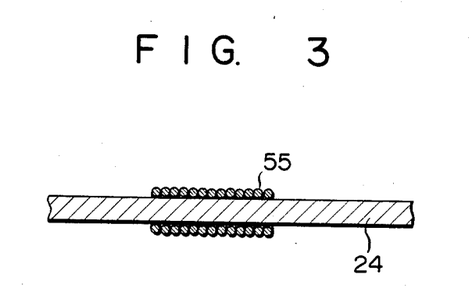
FIG. 3 is a sectional view of a portion of a shape memory element which may be used in the invention.
Figure 4:
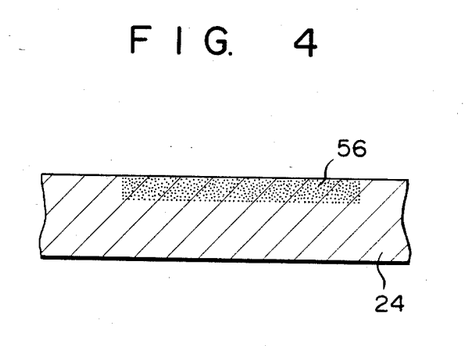
FIG. 4 is a sectional view of a portion of another shape memory element which may be used in the invention.

As is apparent from the above description, the conductive layers 25 and 26 formed on the surface of the alloy plate 24 allow the alloy plate 24 to have locally small resistances. It is readily understood that the conductive layer need not be used if any other means can locally decrease an electrical resistance of the alloy plate 24. For example, as shown in FIG. 3, a conductive wire 55 may be wound around a portion of the alloy plate 24 to decrease the electrical resistance of this portion. The ends of the alloy plate, which are subjected to current control, may be connected to two conductive wires, respectively. Alternatively, as shown in FIG. 4, conductive ions may be implanted in a surface region of the alloy plate 24 to form a conductive layer 56 therein. A means for forming a conductive layer is not limited to electroplating. A thin conductive film may be fixed on the alloy surface by means of soldering, welding, brazing or painting to constitute a conductive layer. A conductive layer may also be made by physical vapor deposition (PCV) such as sputtering or deposition or by chemical vapor deposition (CVD). Adhesion between the conductive layer and the shape memory alloy can be improved by heating, preferably at a temperature higher than 450° C. A material for the conductive layer may be aluminum, gold, silver, iron, nickel or an alloy thereof in addition to copper. A material having a higher electrical conductivity than that of the shape memory alloy is preferably used since a desired resistance is then obtained even if a conductive layer has a small thickness. In this case, when a conductive layer is excessively thick, shape recovery cannot be completely obtained in accordance with the type of metal or alloy used for the conductive layer. Therefore, the thickness of the conductive layer is preferably less than a diameter of the shape memory alloy wire or a thickness of the shape memory alloy plate.

Basic test examples associated with this embodiment will be described. These tests were performed to clarify the exfoliation resistance of the conductive layer against the shape memory alloy and the influence on shape recovery of a portion on the conductive layer formed on the shape memory alloy.

EXAMPLE 1-1

Copper was plated on a shape memory alloy wire having a diameter of 0.2 mm, and a resultant structure was treated with heat at a temperature of 500° to 800° C. for 30 minutes. When the copper-plated shape memory wire was subjected to repeated shape recovery, the exfoliation resistance could be improved twice or more as compared with a case wherein heat treatment was not performed.

EXAMPLE 1-2

A surface oxide film was removed from an Ni (50 at.%)-Ti (50 at.%) alloy wire which memorized a straight shape and which had a diameter of 0.2 mm and a length of 30 cm. Copper was electroplated on a central portion of the wire having a length of 28 cm to a thickness of 10 μm, thereby preparing a shape memory element having the copper plated layer as a conductive layer. The shape memory element was uniformly curved such that the central portion thereof had a radius of curvature of 4 cm. Two ends of the shape memory element were connected to a current source while the two ends could be freely moved. A current of 0.6 A was supplied to the shape memory element for 60 seconds. As a result, a complete shape recovery did not occur in the copper-plated portion.

EXAMPLE 1-3

A surface oxide film was removed from an Ni (50 at.%)-Ti (50 at.%) alloy which memorized a straight shape and which had a diameter of 0.2 mm and a length of 20 cm. A copper wire having a diameter of 0.17 mm was wound around the central portion of alloy having a length of 5 cm at a pitch of 1 mm, thereby preparing a shape memory element having the copper wire as a conductive layer. The shape memory element was corrugated with a radius of curvature of 5 mm and an amplitude of 1.2 cm. The two ends of the shape memory element were connected to a current source, and a current of 1 A was supplied to the shape memory element. The result was that an alloy wire portion without the copper wire recovered the straight shape in one second. However, an alloy wire portion wound with the copper wire recovered only to an extent that the resultant radius of curvature was 6 mm after 10 seconds.

An actuator 10a according to a second embodiment of the present invention will be described with reference to FIG. 5.

This actuator 10a is also utilized to control the opening of the valve in the same manner as in FIG. 1. FIG. 5 shows the main part of the actuator 10a, and any other portion thereof is omitted. The same reference numerals in FIG. 5 denote the same parts as in FIG. 1.

In this actuator 10a, a part of an element mounted to locally decrease a resistance of the shape memory element is used as an electrode. A current flowing through a desired interval of the shape memory element is controlled through this electrode.

A shape memory element 12a of the actuator 10a according to this embodiment comprises: a strip-like alloy plate 61 made of an Ni (50 at.%)-Ti (50 at.%) alloy; conductive layers 62, 63, 64 and 65 such as copper-plated layers formed on four portions of one major surface of the alloy plate 61 at equal intervals so as to decrease the electrical resistance from that of the other portion; and a conductive layer 66 formed on two surface portions at the proximal end of the alloy plate 61. The alloy plate 61 memorizes the straight shape and is then curved to have a radius of curvature of 40 mm. The conductive layers 62, 63, 64 and 65 are electroplated before the alloy plate 61 is curved. A length of the conductive layer along the longitudinal direction of the alloy plate 61 is half the width (e.g., 1.5 mm) of the alloy plate 61. The end of the shape memory element 12a located at the side of the conductive layer 66 is supported by a base 23 through a bolt 29 in the same manner as in FIG. 1.

One end of each lead wire 67, 68, 69, 70 and 71 is connected by soldering to the conductive plate 31 and a corresponding one of the conductive layers 62, 63, 64 and 65. The other end of each lead wire 67, 68, 69, 70 and 71 is connected to a corresponding one of the terminals 72, 73, 74, 75 and 76 mounted on a support member 21. One end of each other lead wire 77, 78, 79, 80 and 81 is connected to a corresponding one of the terminals 72, 73, 74, 75 and 76. The other end of each of the lead wires is connected to a current controller 90.

Figure 6:
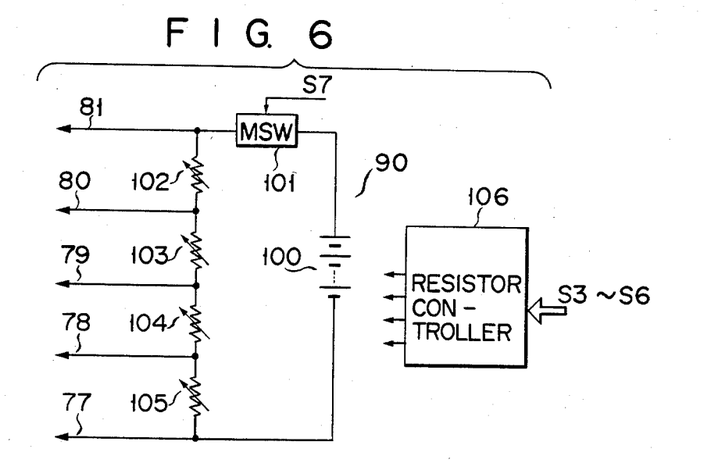
FIG. 6 is a diagram showing a current controller incorporated in the actuator shown in FIG. 5.
Figure 7:
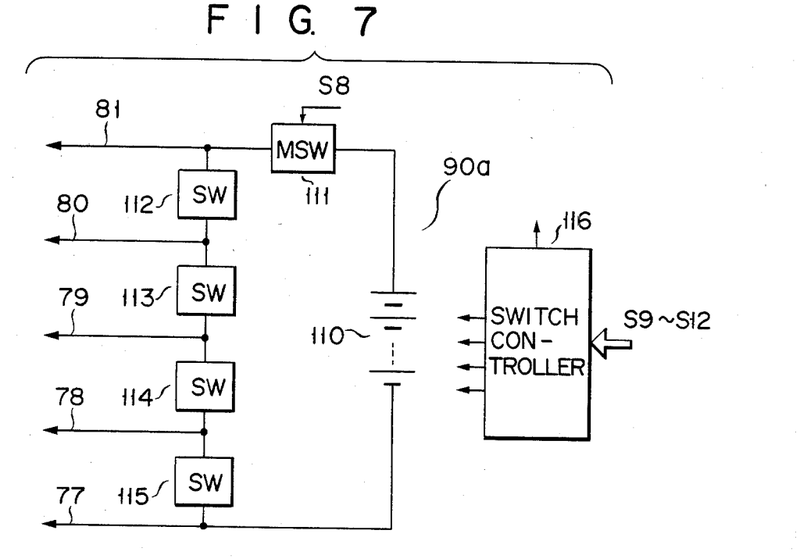
FIG. 7 is a diagram showing a modification of the current controller shown in FIG. 6.
Figure 8:
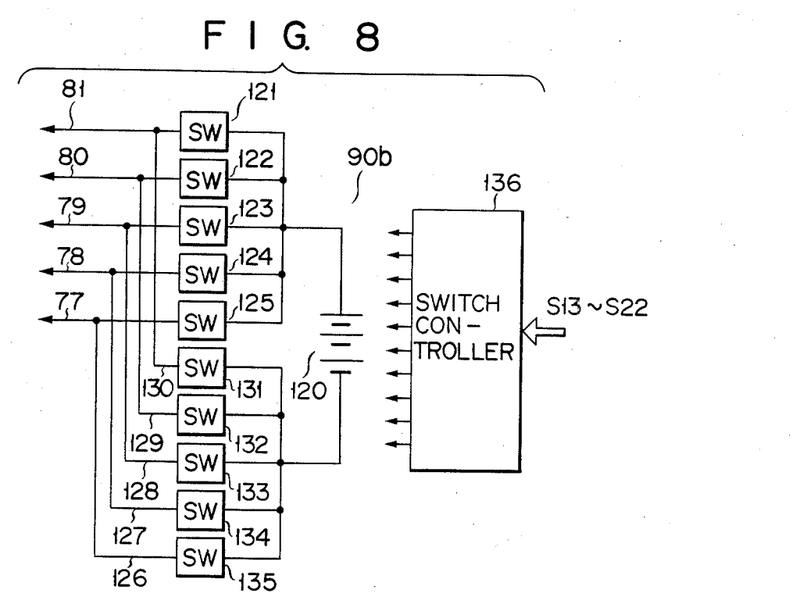
FIG. 8 is a diagram showing another modification of the current controller shown in FIG. 6.

The current controller 90 has an arrangement shown in FIG. 6, or an arrangement as a modification shown in FIG. 7 or 8.

The current controller 90 shown in FIG. 6 comprises a DC power source 100. A series circuit consisting of a main switch 101 and variable resistors 102, 103, 104 and 105 are connected between the positive and negative terminals of the DC power source 100. The lead wires 77, 78, 79, 80 and 81 are respectively connected to the junctions between every adjacent variable resistor, the junction between the variable resistor 102 and the main switch 101, and the junction between the variable resistor 105 and the negative terminal of the DC power source 100. The slider positions of the variable resistors 102, 103, 104 and 105 are controlled by a resistor controller 106. The resistor controller 106 has four motors corresponding to the respective variable resistors. When control signals S3 to S6 are supplied from a control system such as a microcomputer (not shown) to the respective motors, the slider positions of the corresponding variable resistors are displaced by angles corresponding to these signals. A control signal S7 from the control system controls the ON/OFF operation of the main switch 101.

The actuator as a combination of the current controller 90 shown in FIG. 6 and the shape memory element 12a will be operated in the following manner. Assume that the main switch 101 is turned on, the resistance of the variable resistor 102 is set to be indefinitely large, and the resistances of the variable resistors 103 to 105 are set to zero in response to the respective control signals from the control section. Under this control condition, a current from the DC power source 100 flows through a path from the main switch 101, the lead wire 81, the terminal 76, the lead wire 71, the conductive layer 65, the interval of the alloy plate 61 between the conductive layers 65 and 64, the conductive layer 64, the lead wire 70, the terminal 75, the lead wire 80, the variable resistors 103, 104 and 105 whose resistances are set to zero, and the DC power source 100 in the order named. For this reason, the interval between the conductive layers 65 and 64 of the alloy plate 61 is heated and subjected to shape recovery. As is apparent from the above operation, when the resistances of the variable resistors 102 to 105 are properly selected, a desired interval of the alloy plate 61 is subjected to shape recovery. A part of the current can be shunted and can flow through these variable resistors, so that the time required for the shape recovery of the desired interval of the alloy plate 61 can be controlled. The opening of the valve can be controlled with high precision, so that the actuator according to the present invention can provide a variety of applications.

FIG. 7 shows a modification of the current controller. A current controller 90a is obtained by replacing the respective variable resistors with the corresponding semiconductor switches. More specifically, the current controller 90a comprises a DC power source 110. The positive terminal of the DC power source 110 is connected to one end of a main switch 111. Semiconductor switches 112 to 115 made of switching elements such as bipolar transistors, MOS transistors or thyristors are connected in series between the other end of the main switch 111 and the negative terminal of the DC current source 110. Lead wires 77 to 81 are respectively connected to a junction between the main switch 111 and the semiconductor switch 112, junctions between every two adjacent semiconductor switches, and the junction between the semiconductor switch 115 and the DC power source 110. A signal S8 from a control system (not shown) controls the ON/OFF operation of the main switch 111. The ON/OFF operations of the semiconductor switches 112 to 115 are controlled by a switch controller 116. The switch controller 116 controls the ON/OFF operations of the semiconductor switches 112 to 115 in response to control signals S9 to S12 from the control system (not shown).

In the actuator obtained by combining the current controller 90a shown in FIG. 7 and the shape memory element 12a, a desired interval of the alloy plate 61 is subjected to shape recovery in accordance with only the ON/OFF operations of the semiconductor switches 112 to 115. In this case, fine valve opening control can be performed with high precision. Since no mechanically movable members are used in the current source 90a, the actuator as a whole becomes compact.

FIG. 8 shows still another modification of the current controller. A current controller 90b performs partial shape recovery by using a DC power source with a small capacity. The current controller 90b comprises a DC power source 120. The positive terminal of the DC power source 120 is connected to one end of each semiconductor switch 121 to 125. The other end of each semiconductor switch 121 to 125 is connected to a corresponding one of the lead wires 77 to 81. One end of each semiconductor switch 131 to 135 is connected to a corresponding one of the lead wires 77 to 81. The other end of each lead wire 126 to 130 is connected to one end of each of the semiconductor switches 131 to 135. The other end of each semiconductor switch 131 to 135 is connected to the negative terminal of the DC power source 120. The ON/OFF operations of the semiconductor switches 121 to 125 and 131 to 135 are controlled by a switch controller 136. When the switch controller 136 receives control signals S13 to S22, it controls the respective semiconductor switches so as to cause a current flow through a designated interval of the alloy plate 61. More specifically, the ON/OFF control of the switch controller 136 is performed as follows. When the control signals designate an interval of the alloy plate 61 between the conductive layers 62 and 64, the semiconductor switches 123 and 134 are turned on for a short period of time T to cause the current flow through an interval between the conductive layers 63 and 62. When the short period of time T has elapsed, the semiconductor switches 123 and 134 are turned off, and at the same time the semiconductor switches 122 and 133 are turned on for a short period of time T to cause a current flow through an interval of the alloy plate 61 between the conductive layers 64 and 63. Subsequently, the semiconductor switches 123 and 134 are turned on for the period of time T again to cause the current to flow through an interval of the alloy plate 61 between the conductive layers 63 and 62. The ON/OFF operation is repeated in the same manner as described above. In other words, the semiconductor switches are selectively turned on to cause the current flow through a single interval between any two of the conductive layers. In this manner, the shape of the designated interval of the alloy plate 61 is recovered. When the ON control is repeated, the present interval is heated before the previous interval is cooled, and the next interval is heated before the present interval is cooled. In this manner, the shape of the shape memory alloy is recovered as a whole. In this case, a voltage can be lowered since heat is generated from a designated interval each time.

In the actuator as a combination of the current controller 90b shown in FIG. 8 and the shape memory element 12a, the shape of the alloy plate 61 can be partially recovered, so that the stroke can be controlled stepwise with high precision. In this case, since a current flows through one interval as a minimum unit defined by a pair of conductive layers, the capacity of the DC power source 120 can be decreased, and a thin lead wire can be used.

The conductive layers 62 to 65 formed on the surfaces of the alloy plate 61 serve as electrodes, respectively. A material for forming the conductive layers is preferably a material having a high electrical conductivity such as gold, silver, aluminum, nickel or an alloy thereof in addition to copper. By actively radiating heat through the conductive layer, heat transfer between two adjacent intervals through the conductive layer is limited to perform stroke control with high precision. In this sense, the material for the conductive layer comprises a material having a higher thermal conductivity than that of the shape memory alloy. In addition, by properly selecting the thickness and width of the conductive layer, shape recovery of the portion with the conductive layer can be controlled. Therefore, even lead wire disconnected by repeated stressing can be prevented.

Basic examples associated with this embodiment will be described.

A simulation was made by using the current controller 90 shown in FIG. 6 so as to examine the influence of variable resistors on shape recovery of the shape memory element.

Six copper wires each having a diameter of 0.17 mm were brazed on an Ni (50 at.%)-Ti (50 at.%) alloy wire having a diameter of 0.2 mm and a length of 16.5 cm. The first copper wire was brazed from a position spaced 1.25 cm distant from one end of the alloy wire, and the six copper wires were spaced at 2-cm intervals from each other. The intervals provided with the respective copper wires were uniformly deformed as wave shape with a radius of curvature of 2 mm, thereby preparing a shape memory element. Variable resistors each having a variable resistance of 0 to 10Ω were connected to the alloy wire portions between the first and second copper wires, between the third and fourth copper wires and between the fifth and sixth copper wires, respectively. The two ends of the shape memory element were connected to a current source through copper wires of a diameter of 0.17 mm. The resistances of the variable resistors were varied to check and measure the time for shape recovery after a current began to flow.

EXAMPLE 2-1

Resistances of the three variable resistors were set to 3.3Ω, 4.3Ω and 6.5Ω, and a current of 0.42 A was supplied to the shape memory element. The shape of a portion which was not connected to the variable resistor was recovered in 2.5 to 3 seconds. However, the shape of the portion which was connected in parallel with the 3.3-Ω variable resistor was recovered in about 6.5 seconds. The shape of the portion which was connected in parallel with the 4.3-Ω variable resistor was recovered in about 4.5 seconds. The shape of the portion which was connected to the 6.5-Ω variable resistor was recovered in about 3.5 seconds.

EXAMPLE 2-2

The three variable resistors were set at 3.0Ω, 3.3Ω and 6.5Ω, and a current of 0.55 A was supplied to the shape memory element. The shape of a portion which was not connected to the variable resistor was recovered in about 1.5 seconds. However, the shape of the portion which was connected in parallel with the 3.0-Ω variable resistor was recovered in about 2.5 seconds. The shape of the portion which was connected in parallel with the 3.3-Ω variable resistor was recovered in about 2.2 seconds. The shape of the portion which was connected to the 6.5-Ω variable resistor was recovered in about 1.8 seconds.

EXAMPLE 2-3

Resistances of two variable resistors were set at 3.0Ω and 3.3Ω, and a resistance of a remaining variable resistor was set at 0Ω. A current of 0.46 A was supplied to the shape memory element. The shape of a portion which was not connected to the variable resistor was recovered in 1.8 to 2.5 seconds. However, the shape of the portion which was connected in parallel with the 3.0-Ω variable resistor was recovered in about 3.5 seconds. The shape of the portion which was connected in parallel with the 3.3-Ω variable resistor was recovered in about 3.0 seconds. The shape of the portion which was connected to the 0-Ω variable resistor was not recovered at all by the passage of current for 30 seconds.

Examples will be described of what happened when currents flowing through the shape memory element were locally varied without using variable resistors.

EXAMPLE 3-1

First, second and third copper wires of a diameter of 0.2 mm were wound at intervals of 1.7 cm around an Ni (50 at.%)-Ti (50 at.%) alloy wire which memorized a linear shape and which had a diameter of 0.2 mm, and were mechanically joined with the alloy wire. The alloy wire was uniformly curved such that each copper wire wound portion had a radius of curvature of 3 mm, thereby preparing a shape memory element. A voltage of 0.3 V was applied to supply a current of about 0.38 A to the interval defined by the first and second copper wires therethrough. Furthermore, a voltage of 0.5 V was applied to supply a current of about 0.5 A to the interval defined by the second and third copper wires therethrough. The shape of the interval supplied with the current of 0.38 A was completely recovered in about 3.5 seconds, and the shape of the interval supplied with the current of about 0.5 A was completely recovered in about 1.5 seconds.

EXAMPLE 3-2

In order to decrease resistances at the copper wire wound portions in Example 3-1, copper-plated layers were formed on the alloy surface portions connected to the first, second and third copper wires. Each copper-plated layer had a width of about 2 mm and a thickness of about 30 μm. The first, second and third copper wires were soldered to the copper-plated layers. In the same manner as in Example 3-1, a voltage of 0.3 V was applied to an alloy wire portion between the first and second copper wires, and a voltage of 0.5 V was applied to an alloy wire portion between the second and third copper wires. The shape of the portion applied with the voltage of 0.3 V was recovered in about 2.5 seconds, and the shape of the portion applied with the voltage of 0.5 V was recovered in about 1 second.

EXAMPLE 3-3

The same shape memory element as in Example 3-1 was used, and a voltage of 1.3 V was applied to only a portion between the first and second copper wires. Under these conditions, heat transfer to the interval between the second and third copper wires was examined. The shape of the interval was gradually recovered when a period of about 5 seconds had elapsed after a supply of current and was completely recovered in about 90 seconds. When a voltage of 0.5 V was applied, the shape of the interval between the second and third copper wires was not recovered even after 180 seconds.

EXAMPLE 3-4

The same shape memory element as in Example 3-2 was used, and a voltage of 1.3 V was applied to only a portion between the first and second copper wires. Under these conditions, heat transfer to the interval between the second and third copper wires was examined. The shape of the interval between the second and third copper wires was not completely recovered even after 180 seconds. When an application voltage was decreased to 0.5 V, the shape of the interval between the second and third copper wires could not be recovered at all after 180 seconds.

Figure 9:
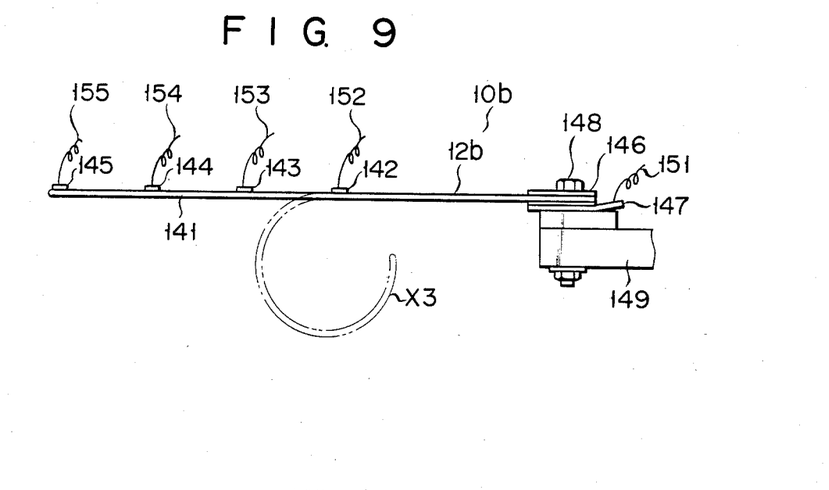
FIG. 9 is a side view showing the main part of an actuator according to a third embodiment of the present invention.

An actuator 10b according to a third embodiment of the present invention will be described with reference to FIG. 9. This actuator 10b is used as a gripper apparatus for gripping an object.

Figure 5:
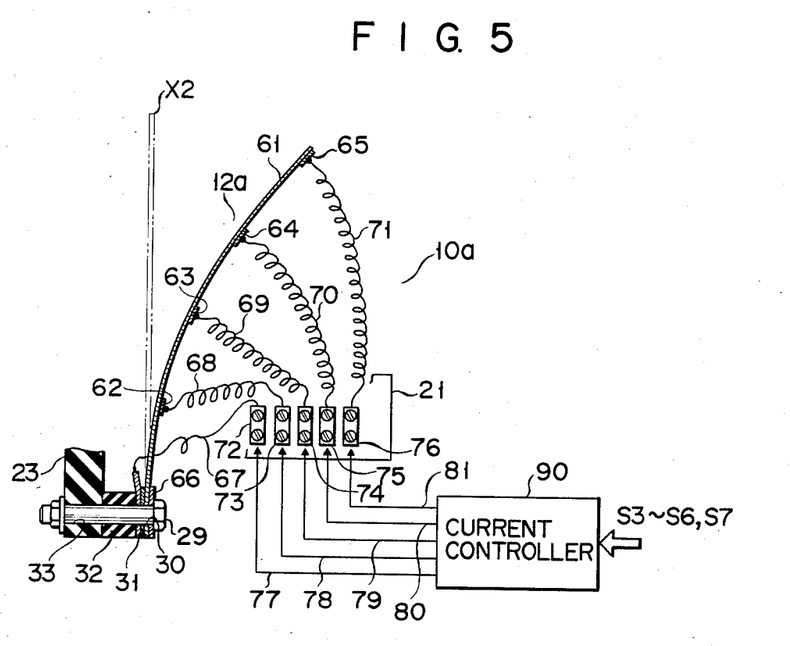
FIG. 5 is a partial side view showing the main part of an actuator according to a second embodiment of the present invention.

The actuator 10b has the same basic arrangement as in FIG. 5.

In the same manner as in FIG. 5, a shape memory element 12b incorporated in the actuator 10b comprises: a strip-like alloy plate 141 made of an Ni (50 at.%)-Ti (50 at.%) alloy; conductive layers 142, 143, 144 and 145 such as copper-plated layers formed on one surface of the alloy plate 141 at a predetermined interval so as to decrease resistances of four portions of the alloy plate 141 along its longitudinal direction; and conductive layers 146 formed on the both surface portions at one edge of the alloy plate 141. The other edge of the alloy plate 141, which is opposite to one edge having the conductive layers 146 as indicated by the two dots dashed lines X3, is worked to have a curved memory shape and then a straight shape. A length of each of the conductive layers 142, 143, 144 and 145 along the longitudinal direction of the alloy plate 141 is set to 2 mm. A portion of a shape memory element 12b which has the conductive layers 146 is supported and fixed by a bolt 148 on a base structure 149 through a conductive plate 147. The base structure 149 is selectively driven by a drive mechanism (not shown) along a vertical direction and a direction perpendicular to the sheet of the drawing. One end of each of lead wires 151, 152, 153, 154 and 155 is connected to the conductive plate 147 and a corresponding one of the conductive layers 142, 143, 144 and 145. The other end of each of these lead wires is connected through a corresponding connecting terminal to a current controller (not shown) having an arrangement in the same manner as in FIGS. 6, 7 or 8.

An operation for grasping a columnar object by using the actuator 10b having a construction for conveying this object to a desired place will be described below.

Figures 10A, 10B:
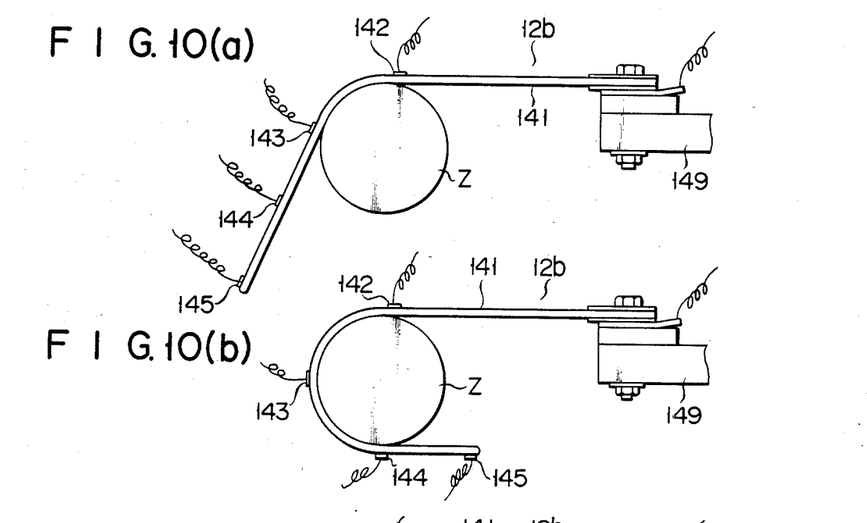
FIGS. 10(a) to 10(c) are respectively representations for explaining the operation of the actuator shown in FIG. 9.
Figure 10C:
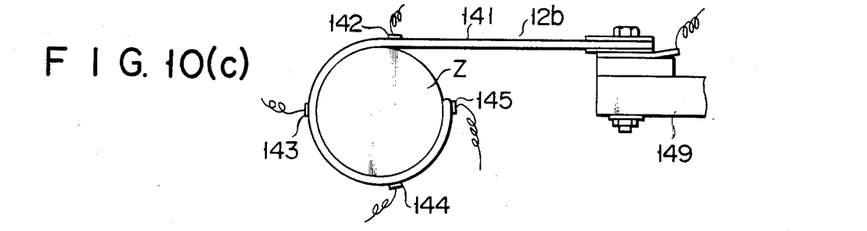

A surface portion of the shape memory element 12b which does not have the conductive layers is brought into contact with an outer surface of an object Z by moving the base structure 149. Subsequently, a current is supplied to an interval between the conductive layers 142 and 143 to recover the memory shape. As shown in FIG. 10(a), part of the shape memory element 12b is wound around the object Z. A current is supplied to an interval between the conductive layers 143 and 144, while a current is also supplied to an interval between the conductive layers 142 and 143, thereby restoring the shape of these intervals. More than ½ of the shape memory element 12b is brought into contact with the outer surface of the object Z, as shown in FIG. 10(b). A current is supplied to the intervals between the conductive layers 144 and 145 to recover the shape of this interval. As shown in FIG. 10(c), the shape memory element 12b is completely brought into contact with ⅔ of the outer surface of the object Z. In this condition, when the base 149 is moved, the object Z can be conveyed in the desired location.

The actuator 10b according to the present invention serves as the operator's fingers to grasp the object. Therefore, this actuator 10b can be applied to a manipulator.

In the above three embodiments, the shape memory elements are made of shape memory alloy plates, respectively. However, the shape memory element may comprise a wire, film, rod, plate or coil element. A Cu shape memory alloy may be used in place of the Ni-Ti alloy.

What we claim is:

1. An actuator wherein an operation stroke is obtained by a shape memory element having an alloy member made of a shape memory alloy for recovering a memory shape when said alloy member is heated, and shape recovery control of said shape memory element is performed by Joule heat generated by a current supplied to said alloy member, characterized in that said shape memory element comprises means for decreasing an electrical resistance of at least one portion of said alloy member, the electrical resistance of said at least one portion being lower than that of any other portion thereof.

2. An actuator according to claim 1, wherein said means for decreasing the electrical resistance decreases electrical resistances of a plurality of portions of said alloy member, the electrical resistances being different from each other.

3. An actuator according to claim 1, wherein said means for decreasing the electrical resistance comprises a conductive layer which is formed on the surface of said alloy member and has a higher electrical conductivity than that of said alloy member.

4. An actuator according to claim 3, wherein said conductive layer is a plating layer, physical vapor deposition layer or chemical vapor deposition layer.

5. An actuator according to claim 3, wherein said conductive layer is heated at a temperature higher than 400° C.

6. An actuator according to claim 1, wherein said means for decreasing the electrical resistance comprises a conductive wire which is wound around said alloy member and which has a higher electrical conductivity than that of said alloy member.

7. An actuator according to claim 1, wherein said means for decreasing the electrical resistance comprises an ion-implanting layer formed in the alloy member which has a higher electrical conductivity than that of said alloy member.

8. An actuator according to claim 1, wherein said means for decreasing the electrical resistance serves as an electrode for receiving an external current.

* * * * *